United States Patent
Byun

(10) Patent No.: US 11,119,938 B2
(45) Date of Patent: Sep. 14, 2021

(54) APPARATUS AND METHOD TO SYNCHRONIZE MEMORY MAP BETWEEN A STORAGE DEVICE AND HOST

(71) Applicant: SK hynix Inc., Icheon-si (KR)

(72) Inventor: Eu Joon Byun, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/665,665

(22) Filed: Oct. 28, 2019

(65) Prior Publication Data
US 2020/0301845 A1   Sep. 24, 2020

(30) Foreign Application Priority Data

Mar. 18, 2019 (KR) .................. 10-2019-0030311

(51) Int. Cl.
*G06F 12/10* (2016.01)

(52) U.S. Cl.
CPC ........ *G06F 12/10* (2013.01); *G06F 2212/657* (2013.01)

(58) Field of Classification Search
CPC ............... G06F 12/10; G06F 2212/657; G06F 2212/7208; G06F 2212/7207; G06F 2212/1016; G06F 12/0246; G06F 2212/7201
See application file for complete search history.

(56) References Cited

U.S. PATENT DOCUMENTS

| 2018/0157414 A1* | 6/2018 | Tanaka | G06F 3/0656 |
| 2019/0266079 A1* | 8/2019 | R | G06F 3/064 |
| 2020/0089603 A1* | 3/2020 | Jin | G06F 3/061 |
| 2020/0301852 A1* | 9/2020 | Byun | G06F 12/126 |

FOREIGN PATENT DOCUMENTS

| KR | 101351550 B1 | 1/2014 |
| KR | 1020180018886 A | 2/2018 |

\* cited by examiner

*Primary Examiner* — Sean D Rossiter
(74) *Attorney, Agent, or Firm* — William Park & Associates Ltd.

(57) ABSTRACT

A data storage device may include: a controller, including a host memory and a device memory, configured to communicate with a host, wherein one or more host unit regions, having a first size, are allocated to the host memory; and a storage including a nonvolatile memory device. The controller may include a map data manager configured to store map data in the storage, the map data including a mapping relationship between logical addresses of the host and physical addresses of the data storage device, configured to group the logical addresses into logical address groups so that the total size of map data for each of the logical address groups corresponds to the first size, and manage a reference count for each of the logical address groups.

14 Claims, 9 Drawing Sheets

APPARATUS AND METHOD TO SYNCHRONIZE MEMORY MAP BETWEEN A STORAGE DEVICE AND HOST

CROSS-REFERENCES TO RELATED APPLICATION

The present application claims priority under 35 U.S.C. § 119(a) to Korean application number 10-2019-0030311, filed on Mar. 18, 2019, in the Korean Intellectual Property Office, which is incorporated herein by reference in its entirety.

BACKGROUND

1. Technical Field

Various embodiments generally relate to a semiconductor integrated device, and more particularly, to a data storage device, a computing device having the same and an operation method thereof.

2. Related Art

A storage device is coupled to a host and performs a data input/output operation according to a request of the host. The storage device may use a variety of storage media to store data.

Map data, which is required to synchronize the host and the storage device with each other, includes information on a mapping relationship between the logical addresses used by the host and the physical addresses used by the storage device.

In general, the map data is managed in the storage device. However, research is being conducted to load (cache) the map data to a memory, included in the host, and using the loaded map data to improve response speed.

However, since the size of the map data, managed in the map data storage region of the storage device, does not coincide with the size of map data managed in the map data storage region of the host, there is a need for a method for smoothly and efficiently synchronizing the map data.

SUMMARY

In an embodiment, a data storage device may include: a controller, including a host memory and a device memory, configured to communicate with a host, wherein one or more host unit regions, having a first size, are allocated to the host memory; and a storage including a nonvolatile memory device. The controller may include a map data manager configured to store map data in the storage, the map data including a mapping relationship between logical addresses of the host and physical addresses of the data storage device, configured to group the logical addresses into logical address groups so that the total size of map data for each of the logical address groups corresponds to the first size, and manage a reference count for each of the logical address groups.

In an embodiment, a computing device may include: a data storage device including a controller, having a device memory, and a storage, having a nonvolatile memory device; and a host configured to communicate with the data storage device, wherein the data storage device stores map data in the storage, the map data including a mapping relationship between logical addresses of the host and physical addresses of the data storage device, wherein the host comprises: a host memory; a processor configured to allocate one or more host unit regions having a first size to the host memory; and a map data manager configured to group the logical addresses of the host into logical address groups so that the total size of the map data for each of the logical address groups corresponds to the first size and configured to manage a reference count for each of the logical address groups.

In an embodiment, there is provided an operation method of a computing device which includes a data storage device including a controller having a device memory and a storage having a nonvolatile memory device, and a host configured to communicate with the data storage device. The operation method may include the steps of: storing, by the data storage device, map data in the storage, the map data including a mapping relationship between logical addresses of the host and physical addresses of the data storage device; allocating, by the host, one or more host unit regions having a first size to a host memory; grouping, by the controller, the logical addresses into logical address groups so that the total size of map data for each of the logical address groups corresponds to the first size; and managing, by the controller, per group reference counts for the respective logical address groups.

DETAILED DESCRIPTION

Figure 1:
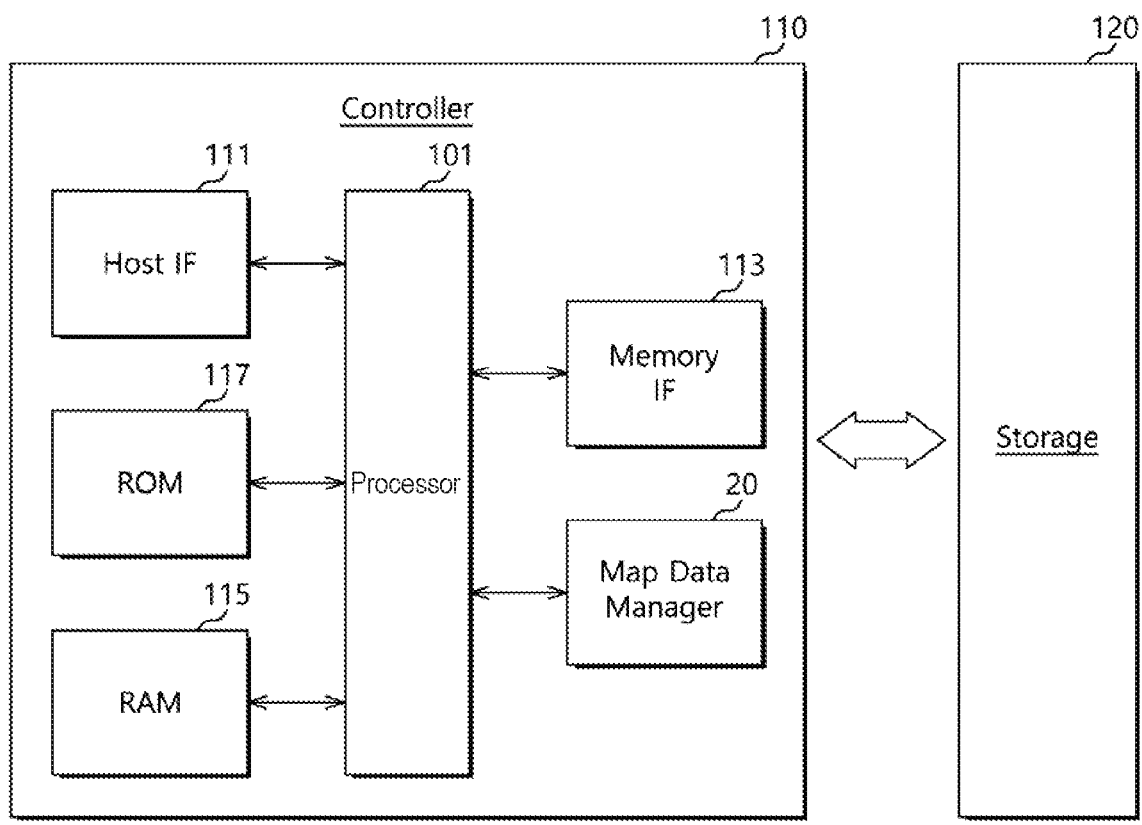
FIG. 1 is a configuration diagram, illustrating a data storage device, in accordance with an embodiment.

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

The embodiments according to the concept of the present disclosure can be modified in various ways and have various shapes. Thus, the embodiments are illustrated in the drawings and are intended to be described herein in detail. However, the embodiments according to the concept of the present disclosure are not construed as limited to specified disclosures, and include all changes, equivalents, or substitutes that do not depart from the spirit and technical scope of the present disclosure.

While terms such as "first" and "second" may be used to describe various components, such components must not be understood as being limited to the above terms. The above terms are used only to distinguish one component from another. For example, a first component may be referred to as a second component without departing from the scope of rights of the present disclosure, and likewise a second component may be referred to as a first component.

It will be understood that when an element is referred to as being "connected" or "coupled" to another element, it can be directly connected or coupled to the other element or intervening elements may also be present. In contrast, when an element is referred to as being "directly connected" or "directly coupled" to another element, no intervening elements are present.

It will be understood that when an element is referred to as being "between" two elements, it can be the only element between the two elements, or one or more intervening elements may also be present.

The terms used in the present application are merely used to describe particular embodiments, and are not intended to limit the present disclosure. Singular forms in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Hereinafter, a data storage device, a computing device having the same and an operation method thereof according to the present disclosure will be described below with reference to the accompanying drawings through exemplary embodiments.

FIG. 1 is a configuration diagram, illustrating a data storage device 100, in accordance with an embodiment.

Referring to FIG. 1, the data storage device 100 may include a controller 110 and a storage 120.

The controller 110, in accordance with the present embodiment, may include a processor 101, a host interface (I/F) 111, a memory I/F 113, a device memory (RAM) 115, a ROM 117 and a map data manager 20.

The processor 101 may be configured to transfer various pieces of control information to the host I/F 111, the memory I/F 113, the RAM 115 and the map data manager 20. The various pieces of control information are required for reading or writing data from or to the storage 120. In an embodiment, the processor 101 may read firmware or software codes (provided for various operations of the storage system 100 from the storage 120), load the read codes to the RAM 115, and analyze and execute the loaded codes, in order to control overall operations of the data storage device 100.

In an embodiment, of a flash translation layer (FTL) for performing garbage collection, address mapping or wear leveling to manage the storage 120. The processor 101 may also perform a function of detecting and correcting an error of data read from the storage 120.

The host I/F 111 may provide a communication channel to receive a command, address, data, and clock signal from the host and to control the input/output data, under the control of the processor 101. The host I/F 111 may provide a physical connection between a host and the data storage device 100. Furthermore, the host I/F 111 may provide an interface with the storage 120, according to the bus format of the host. The bus format of the host may include one or more of the standard interface protocols such as secure digital, USB (Universal Serial Bus), MMC (Multi-Media Card), eMMC (Embedded MMC), PCMCIA (Personal Computer Memory Card International Association), PATA (Parallel Advanced Technology Attachment), SATA (Serial Advanced Technology Attachment), SCSI (Small Computer System Interface), SAS (Serial Attached SCSI), PCI (Peripheral Component Interconnection), PCI-E (PCI Express) and UFS (Universal Flash Storage).

The ROM 117 may store program codes required for an operation of the controller 110, for example, firmware or software. Furthermore, the ROM 117 may store code data used by the program codes.

The RAM 115, serving as a device memory, may temporarily store data required for an operation of the controller 110, data generated by the controller 110, or data transmitted/received between the host and the storage 120.

The processor 101 may control a booting operation of the memory system by loading a boot code stored in the storage 120 or the ROM 117. The processor 101 may load the boot code to the RAM 115 during the booting operation.

The memory I/F 113 may provide a communication channel to transmit/receive signals between the controller 110 and the storage 120. The memory I/F 113 may write data to the storage 120, under the control of the processor 101, the data being temporarily stored in the RAM 115 or a buffer memory (not illustrated). Furthermore, the memory I/F 113 may transfer data read from the storage 120 to the RAM 115 or the buffer memory to temporarily store the data.

The storage 120 may include a memory device selected from various nonvolatile memory devices, such as EEPROM (Electrically Erasable and Programmable ROM), NAND flash memory, NOR flash memory, PRAM (Phase-Change RAM), ReRAM (Resistive RAM), FRAM (Ferroelectric RAM) and STT-MRAM (Spin Torque Transfer Magnetic RAM). The storage 120 may include a plurality of dies Die 0 to Die n, a plurality of chips, or a plurality of packages. Furthermore, the storage 120 may serve as single-level cells, each configured to store one-bit data therein or multi-level cells, each configured to store multi-bit data therein.

The controller 110 may manage various metadata required for managing the storage 120. The metadata may be stored in the storage 120, and the controller 110 may read the metadata from the storage 120 and use the read metadata in case of necessity.

In an embodiment, the metadata may include map data MAP. The map data MAP may be stored in a specific region of the storage 120 and may be managed by the processor 101 of the controller 110 or the map data manager 20.

The map data MAP may include mapping information based on physical addresses of storage spaces constituting the storage 120 and logical addresses assigned to the data storage device 100 by the host.

The controller 110 may load the map data MAP, from the storage 120, as the map cache data C_MAP, to the device memory 115. The controller 110 may also use the loaded map data as a request of the host or to perform a background operation of the data storage device 100.

The map data MAP is updated while the controller 110 performs an operation, according to a request of the host, or performs a background operation. While the map data MAP is updated, the controller 110 may store the updated map data MAP in the storage 120.

The data storage device 100 may be configured to transfer all or part of the map data MAP to the host. Thus, the host may transfer a read request, including a physical address, to the data storage device 100 by referring to the host map cache data H_MAP stored therein. Since the host transfers the read request, including the physical address, the controller 110 may avoid the operation of performing address translation or the operation of reading a necessary part of the map data MAP from the storage 120. Therefore, the time required for the data storage device 100 to process a request of the host may be reduced, improving the operating speed of a computing device.

The map data manager 20 may control a management operation for the host map cache data H_MAP to be stored in the host. For example, the map data manager 20 may configure logical address groups by grouping logical addresses.

As a processor of the host allocates one or more host unit regions, having a first size, to the host, the map data manager 20 may configure the logical address groups so that the total size of map data for each of the logical address groups corresponds to the size (the first size) of the host unit region. Furthermore, the map data manager 20 may manage the number of times that each of the logical address groups is referred to (hereafter, referred to as a reference count).

In an embodiment, the reference count may indicate the number of times that logical addresses are accessed.

Specifically, the map data manager 20 may manage logical addresses for each of the logical address groups, physical addresses corresponding to the logical addresses, reference counts for the logical addresses, and "per group reference counts" indicating the number of access counts for the respective logical address groups. The map data manager 20 may select a logical address group, the map data of which is stored in a host unit region, based on the per group reference counts, and store the map data of the selected logical address group in the host unit region.

Figure 2:
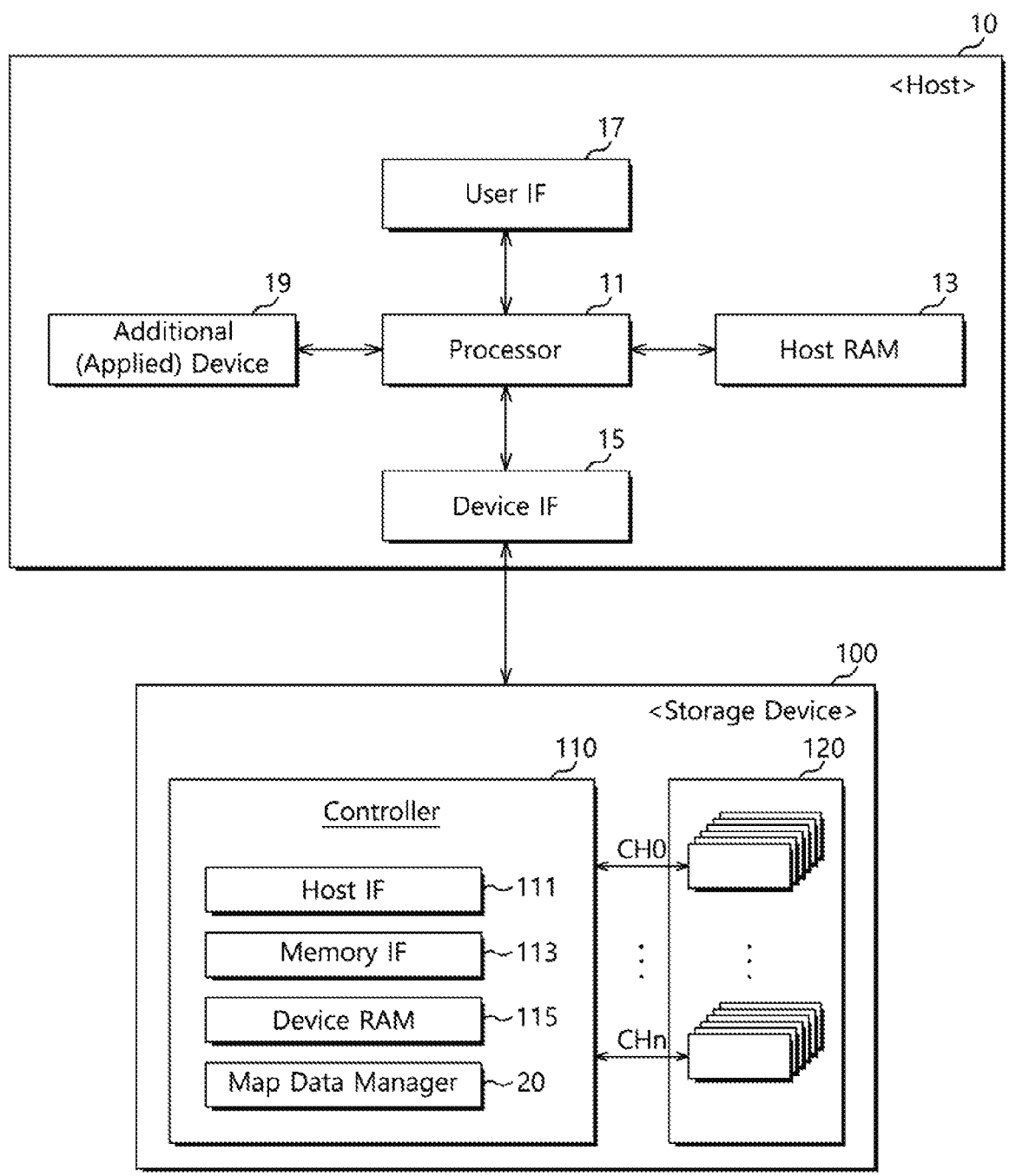
FIG. 2 is a configuration diagram, illustrating a computing device, in accordance with an embodiment.

FIG. 2 is a configuration diagram, illustrating a computing device 1, in accordance with an embodiment.

Referring to FIG. 2, the computing device 1 may include a host 10 and a data storage device 100.

The host 10 may include a processor 11, a host memory 13, a device I/F 15, a user I/F 17 and an additional (application) device 19.

The processor 11 may control overall operations of the computing device 1, and perform a logical operation. The processor 11 may be a hardware-based data processing device, including a circuit that is physically configured to execute commands that are included in a code or a program.

The host memory 13 may include a main memory of the host 10, communicating with the processor 11. The host memory 13 may temporarily store codes and data that are executed by and referred to by the processor 11. The processor 11 may execute a code. For example, the processor 11 may execute an operating system or application by using the host memory 13. The processor 11 may also process data by using the host memory 13. The host memory 13 may be selected from random access memories, including volatile memory devices such as an SRAM (Static RAM), DRAM (Dynamic RAM) and SDRAM (Synchronous DRAM) or nonvolatile memory devices such as a PRAM (Phase-change RAM), MRAM (Magnetic RAM), RRAM (Resistive RAM) and FeRAM (Ferroelectric RAM).

The device I/F 15 may provide a physical connection between the host 10 and the data storage device 100.

The user I/F 17 may allow a user to communicate with the processor 11. For example, the user I/F 17 may include user input interfaces such as a keyboard, keypad, button, touch panel, touch screen, touch pad, touch ball, camera, microphone, gyroscope sensor and vibration sensor. The user I/F 17 may include user output interfaces such as an LCD (Liquid Crystal Display), OLED (Organic Light Emitting Diode) display device, AMOLED (Active Matrix OLED) display device, LED, speaker and monitor.

The additional (application) device 19 may include a modem, for enabling the computing device 1 to communicate with an external device, according to various wired/wireless communication protocols.

The data storage device 100 may include a controller 110 and a storage 120. The controller 110 may include a host I/F 111, a memory I/F 113, a device memory 115 and a map data manager 20 similar to FIG. 1.

The host I/F 111 may provide a communication channel to receive a command and clock signal from the host 10 and to control the input/output of data. In particular, the host I/F 111 may provide a physical connection between the host 10 and the data storage device 100. Furthermore, the host I/F 111 may provide an interface with the data storage device 100, according to the bus format of the host 10. The bus format of the host 10 may include one or more of the standard interface protocols such as secure digital, USB (Universal Serial Bus), MMC (Multi-Media Card), eMMC (Embedded MMC), PCMCIA (Personal Computer Memory Card International Association), PATA (Parallel Advanced Technology Attachment), SATA (Serial Advanced Technology Attachment), SCSI (Small Computer System Interface), SAS (Serial Attached SCSI), PCI (Peripheral Component Interconnection), PCI-E (PCI Express) and UFS (Universal Flash Storage).

The memory I/F 113 may provide a communication channel for transmitting/receiving signals between the controller 110 and the storage 120. The memory I/F 113 may write data, transferred from the host 10, to the storage 120. Furthermore, the memory I/F 113 may provide data, read from the storage 120 to the host 10.

The device memory 115 may include a ROM to store program codes, required for an operation of the controller 110, such as firmware or software, and to store code data used by the program codes. The device memory 115 may also include a RAM for storing data, the data required for an operation of the controller 110 or the data generated by the controller 110 itself.

The host 10 may store data, data that requires long-term storage, in the data storage device 100. The data storage device 100 may store source codes of various pieces of software, such as a boot image, operating system, and applications for driving the computing device 1. The data storage device 100 may also store data processed by the source codes.

The data storage device 100 may include, as the storage 120, a memory device selected among various nonvolatile memory devices, such as an EEPROM (Electrically Erasable and Programmable ROM), NAND flash memory, NOR flash memory, PRAM (Phase-Change RAM), ReRAM (Resistive RAM), FRAM (Ferroelectric RAM) and STT-MRAM (Spin Torque Transfer Magnetic RAM). The storage 120 may include a plurality of memory devices, each constituted by a plurality of dies Die 0 to Die n, a plurality of chips or a plurality of packages. The respective memory devices may be coupled to the controller 110 through channels CH0 to CHn. Furthermore, the storage 120 may include single-level cells, each configured to store one-bit data therein or the storage 120 may include multi-level cells, each configured to store multi-bit data therein.

The controller 110 may manage various metadata, required for managing the storage 120. The metadata may be stored in the storage 120, and the controller 110 may load the metadata from the storage 120 to the device memory 115 and use the loaded metadata when necessary.

In an embodiment, the metadata may include map data MAP. The map data MAP may include mapping information based on physical addresses of storage spaces constituting the storage 120 and logical addresses used by the host 10. The controller 110 may load map data from the storage 120, as map cache data C_MAP, to the device memory 115. The controller may also use the loaded map data as a request of the host 10 or to perform a background operation of the data storage device 100.

The device memory 115, in which the map cache data C_MAP is stored, may be a RAM (for example, an SRAM). The map data MAP is updated while the controller 110 performs an operation, according to a request of the host 10, or performs a background operation. While the map data MAP is updated, the controller 110 may store the updated map data MAP in the storage 120.

The data storage device 100 may be configured to transfer all or part of the map data MAP to the host 10. The host 10 may store all or a part of the map data MAP, transferred from the data storage device 100, as the host map cache data H_MAP, in the host memory 13. Thus, the host 10 may transfer a read request, including a physical address, to the data storage device 100 by referring to the host map cache data H_MAP stored in the host memory 13. Since the host 10 transfers the read request, including the physical address, the controller 110, may avoid the operation of performing address translation or the operation of reading a necessary part of the map data MAP from the storage 120. Therefore, the time required for the data storage device 100 to process a request of the host 10 may be reduced, improving the operating speed of the computing device 1.

The map data manager 20 may control a management operation for the host map cache data H_MAP stored in the host memory 13.

The processor 11 may allocate one or more host unit regions, having a first size, to the host memory 13.

The map data manager 20 may configure logical address groups by grouping logical addresses. Specifically, the map data manager 20 may configure the logical address groups so that the total size of map data for each of the logical address groups corresponds to the first size allocated to the host memory 13. The map data manager 20 may manage a reference count for each of the logical address groups.

In an embodiment, the reference count may indicate the number of times that logical addresses are accessed.

Specifically, the map data manager 20 may manage logical addresses for each of the logical address groups, physical addresses corresponding to the logical addresses, reference counts for the logical addresses, and "per group reference counts" indicating the number of access counts for the respective logical address groups. The map data manager 20 may select a logical address group, the map data of which is stored in a host unit region based on the per group reference counts, and store the map data of the selected logical address group in the host unit region.

Figure 3:
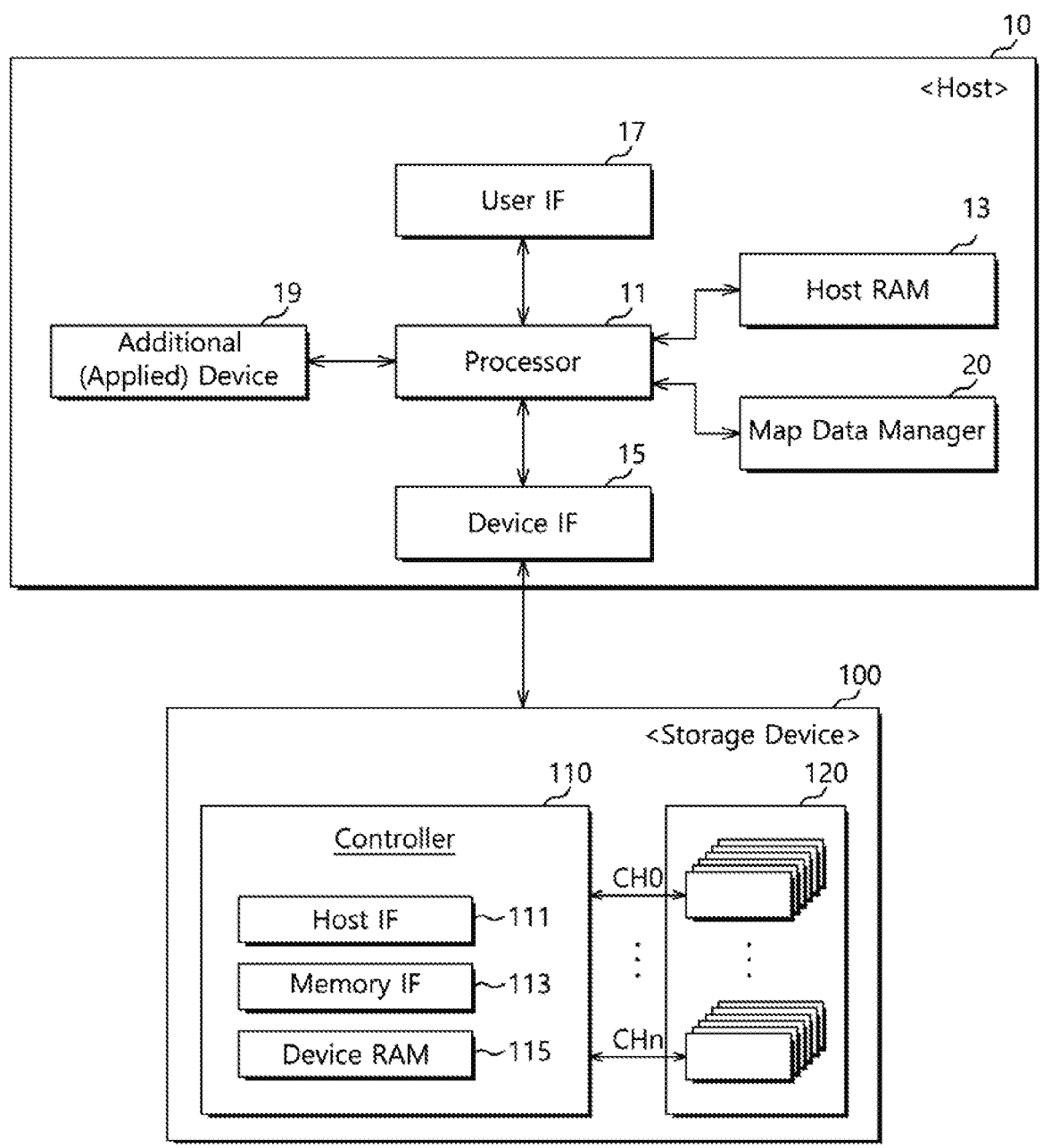
FIG. 3 is a configuration diagram, illustrating a computing device, in accordance with an embodiment.

FIG. 3 is a configuration diagram, illustrating a computing device 1-1, in accordance with an embodiment.

Referring to FIG. 3, the computing device 1-1 may include a host 10 and a data storage device 100.

The host 10 of the computing device 1-1, illustrated in FIG. 3, may include a map data manager 20 to control a management operation for the host map cache data H_MAP, stored in a host memory 13.

Since the host 10 includes the map data manager 20 to manage the host map cache data H_MAP, it is not necessary to transfer authority to the data storage device 100 to manage the host memory 13. Therefore, the data storage device 100, implemented in various manners, may be applied to the computing device 1-1.

Figure 4:
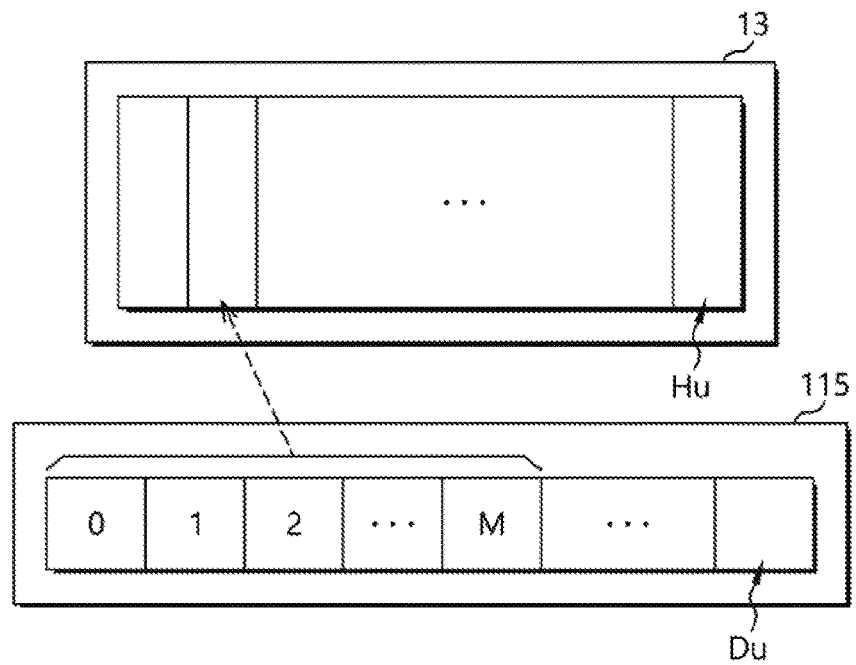
FIG. 4 is a diagram, illustrating a map data storage region of the computing device, in accordance with the present embodiment.

FIG. 4 is a diagram, for describing a map data storage region of the computing device, in accordance with the present embodiment.

As illustrated in FIG. 4, the processor 11, of the host 10, may allocate one or more regions of the host memory 13 as a storage region for the host map cache data H_MAP. The storage region for the host map cache data H_MAP may be constituted by a plurality of host unit regions HU. The host map cache data H_MAP may be stored in a host unit region HU.

In order to store new host map cache data H_MAP, the processor 11 may allocate a host unit region HU. When there is no remaining region to allocate the host unit region HU, the processor 11 may select a host unit region HU that satisfies a preset condition among the plurality of host unit regions HU. Then, the processor 11 may update the host map cache data H_MAP within the selected host unit region HU to the new host map cache data H_MAP.

The word "preset" as used herein with respect to a parameter, such as a preset condition, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

The controller 110 of the data storage device 100 may allocate a region to store the map cache data C_MAP within the device memory 115. The region, to store the map cache data C_MAP, may be constituted by a plurality of device unit regions DU. The map cache data C_MAP may be stored in a device unit region DU, allocated to the device memory 115.

In an embodiment, the entire map data MAP or at least a part of map data MAP, stored in the storage 120, which are selected according to a preset condition, may be cached as the map cache data C_MAP into the device unit region DU.

The map cache data C_MAP, cached in one device unit region DU, may be a unit entry or a unit segment, corresponding to a group of entries. The entry may indicate information obtained by mapping a logical address LBA, assigned to identify a unit logical storage space, to a physical address PBA, assigned to identify a unit physical storage space.

The device unit region DU, allocated to the device memory 115, may have a different size from the host unit region HU allocated to the host memory 13.

In an embodiment, the size of the host unit region HU may be M times larger than that of the device unit region DU. Therefore, the map cache data C_MAP, stored in a plurality of device unit regions DU, i.e. M device unit regions DU, may be stored as the host map cache data H_MAP in one host unit region HU.

In order to select all or some of the map cache data C_MAP, according to a preset condition, and to load the selected data to the host memory 13, the size of the host unit region HU allocated to the host memory 13 may be considered.

That is, in order to make the most of the host unit region HU allocated to the host memory 13, the map cache data C_MAP may be grouped to have a size corresponding to the size of the host unit region HU.

In other words, the logical addresses may be divided into groups so that the total size of map data for the logical addresses, included in each of the logical address groups, corresponds to the size of the host unit region HU. Furthermore, a logical address group, including the map data to be loaded to the host memory 13, may be selected according to an access condition (count or frequency) of the map data MAP included in each of the logical address groups.

The map data may be managed by the host 10. For this operation, the host 10 may include the map data manager 20.

In another embodiment, the map data may also be managed by the data storage device 100. In this case, the map data manager 20 may be included in the data storage device 100.

Figure 5:
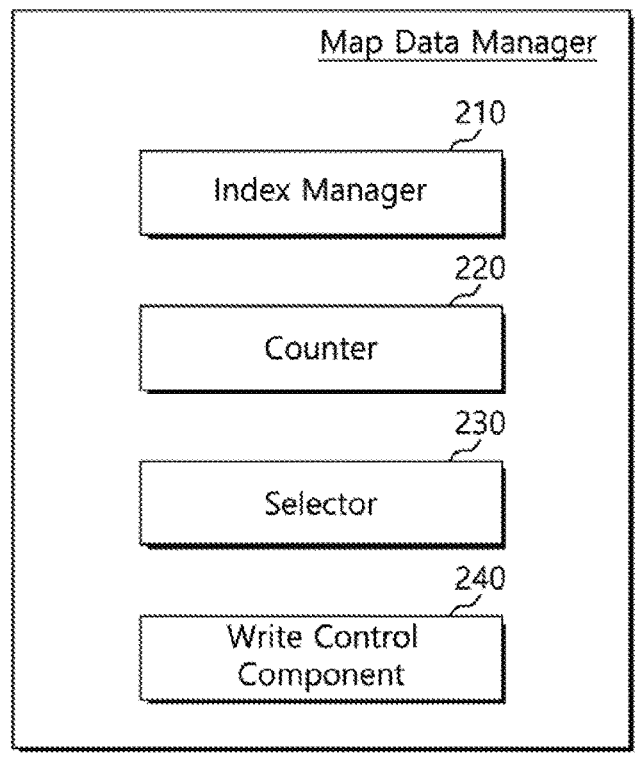
FIG. 5 is a configuration diagram, illustrating a map data manager, in accordance with the present embodiment.
Figure 6:
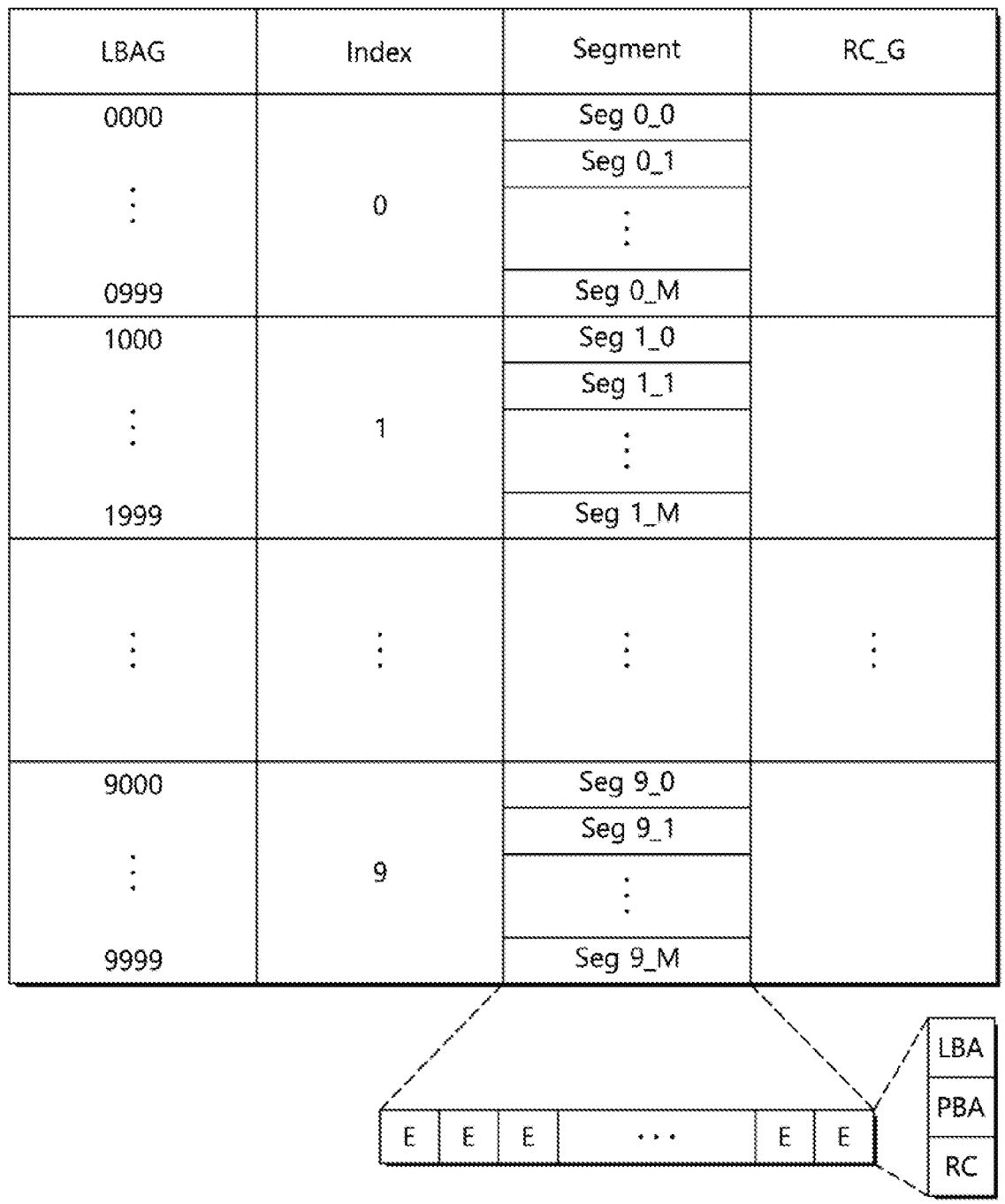
FIG. 6 is a diagram for describing a map data management concept of the computing device, in accordance with the present embodiment.

FIG. 5 is a configuration diagram, illustrating the map data manager, in accordance with the present embodiment, and FIG. 6 is a diagram, for describing a map data management concept of the computing device, in accordance with the present embodiment.

Referring to FIGS. 5 and 6, the map data manager 20 may include an index manager 210, a counter 220, a selector 230 and a write control component 240.

The index manager 210 may divide logical addresses by a designated unit and manage the divided logical addresses as a plurality of logical address groups. For example, as illustrated in FIG. 6, the index manager 210 may divide logical addresses LBA<0000:9999> into a designated number of groups, for example, 10 groups, and assign indexes 0 to 9 for identifying the respective logical address groups LBAG.

Referring to FIG. 6, the logical address group LBAG0, which the index 0 is assigned, may include the logical addresses LBA<0000:0999>. Furthermore, the logical address group LBAG1, is which the index 1, is assigned may include the logical addresses LBA<1000:1999>.

The respective logical address groups LBAG may include a plurality of segments Seg0_0 to Seg0_M, Seg1_0 to Seg1_M, . . . , Seg9_0 to Seg9_M. Each of the segments Seg0_0 to Seg0_M, Seg1_0 to Seg1_M, . . . , Seg9_0 to Seg9_M may include a plurality of entries E. Each of the entries E may include a logical address LBA, a physical address PBA corresponding to the logical address LBA, and an access count RC for the corresponding entry.

In other words, each logical address LBA, a physical address PBA corresponding to the logical address LBA and an access count RC for the logical address may be managed as individual entries, and a plurality of entries may be managed as one segment. Furthermore, when the logical addresses LBA are divided into the designated number of groups, each of the logical address groups LBAG may include a plurality of entries and a plurality of segments, each of the plurality of segments having the plurality of entries.

Map data, selected by the preset condition among the map cache data C_MAP stored in the device memory 115, may be loaded to the host memory 13. The host 10 may allocate one or more host unit regions HU, having a preset size, to the host memory 13 to store the host map cache data H_MAP.

In an embodiment, a device unit region DU, capable of storing map cache data on an entry or segment basis, may be allocated to the device memory 115. Furthermore, a host unit region HU, capable of storing the host map cache data H_MAP on a logical address group basis, may be allocated to the host memory 13. Therefore, the logical addresses may be divided into logical address groups so that the total size of map data for each of the logical address groups corresponds to the size of the host unit region HU.

The counter 220 may count the number of times that each entry E is referred to (per entry reference count RC) and the number of times that each logical address group LBAG is referred to (per group reference count RC_G).

The reference count RC_G, of a specific logical address group LBAG, may indicate the sum of the reference counts RC for the respective entries E included in the logical address group LBAG.

The reference count RC of the entry E may be maintained or increased while the entry E is loaded in the device memory 115. The reference count RC of the entry E may be reset when the entry is removed from the device memory 115. Therefore, the reference count RC_G of the logical address group LBAG may reflect the reference conditions of the respective entries.

The selector 230 may select the logical address group LBAG of the map data, to be cached into the host memory 13, based on the count results of the counter 220. In an embodiment, the selector 230 may select the map data of the logical address group LBAG having the maximum per group reference count, but the present embodiment is not limited thereto.

The write control component 240 may store the map data of the logical address group LBAG, selected by the selector 230, in a host unit region HU of the host memory 13.

The map data manager 20 may group all logical addresses used by the host 10, select the host map cache data H_MAP by calculating the reference counts RC_G of the respective logical address groups LBAG, and store the selected host map cache data H_MAP in a host unit region HU of the host memory 13. Since the size of the map data included in each of the logical address groups corresponds to the size of the host unit region HU, the utilization efficiency of the host unit region HU, allocated to the host memory 13, can be maximized.

The map data manager 20, illustrated in FIG. 5, may be installed in at least one of the processor 11 of the host 10 or the controller 110 of the data storage device 100.

Figure 7:
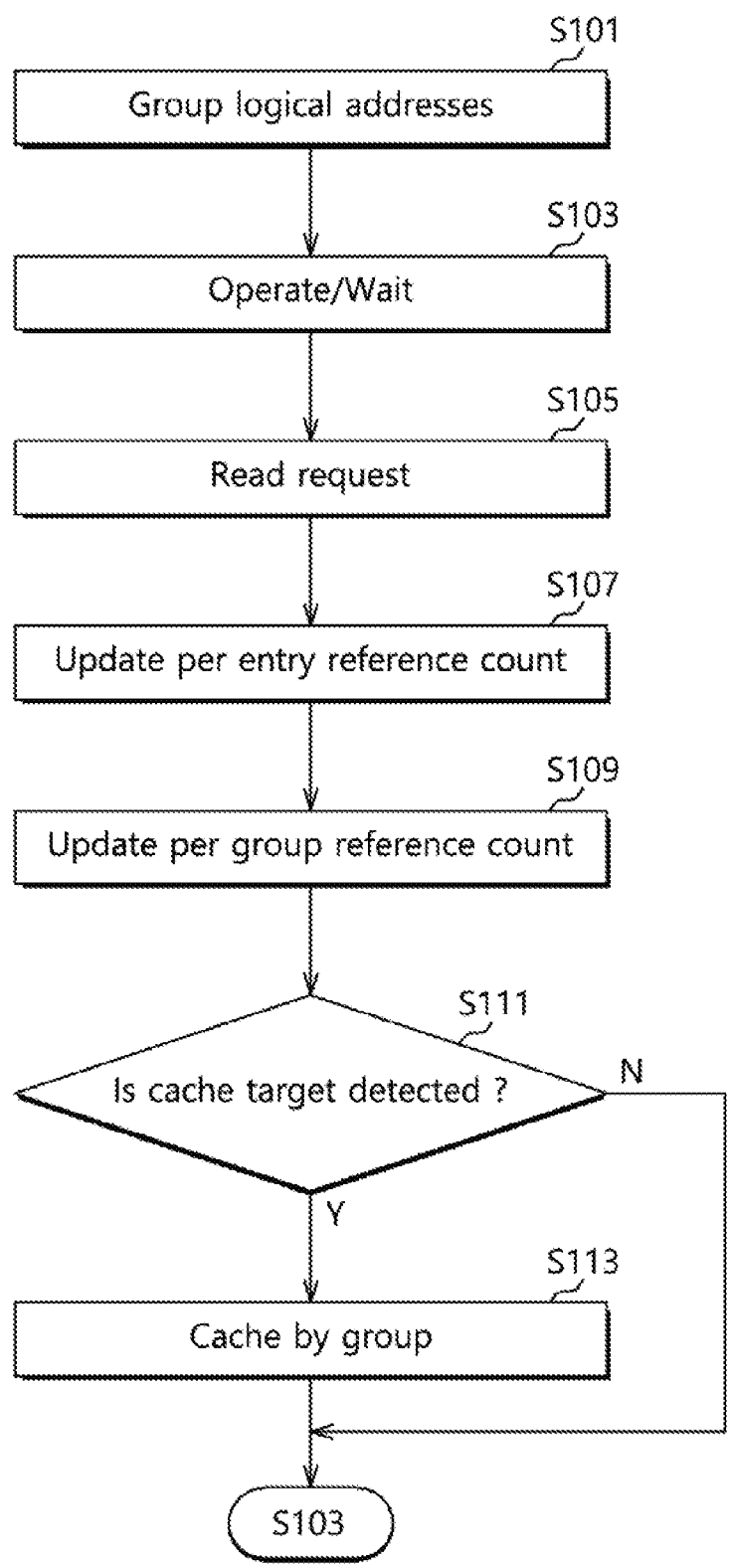
FIG. 7 is a flowchart for describing an operation method of a computing device, in accordance with an embodiment.

FIG. 7 is a flowchart, for describing an operation method of the computing device, in accordance with an embodiment.

In step S101, the map data manager 20, which may be installed in the host 10 or the data storage device 100, may divide logical addresses into logical address groups so that the total size of the map data for each of the logical address groups corresponds to the size of the host unit region HU.

For example, when the size of each entry E is represented by "A" and the size of the host unit region HU is represented by "B", the map data manager 20 may set "B/A" logical addresses to one logical address group.

While the computing device operates or waits in step S103, a read request of the host 10 may occur in step S105. The read request may include a logical address LBA.

In steps S107 and S109, the map data manager 20 may change the reference count RC of the entry, corresponding to the logical address LBA provided at the time of the read request, and the reference count RC_G of the logical address group LBAG including the logical address LBA, corresponding to the read request.

When the logical address group LBAG to be loaded to the host memory 13 is detected (Y in step S111) according to the update of the reference counts, the map data manager 20 may store the map data of the detected logical address group in a host unit region HU of the host memory 13 in step S113. When a target to be cached to the host memory 13 is not detected (N in step S111), the process may proceed to step S103 to continuously monitor the reference counts for each entry E and each logical address group LBAG.

As described above, the map data manager 20 can group the map data to correspond to the size of the host unit region HU and cache the grouped map data into the host memory 13, thereby maximizing the management efficiency of the host memory 13.

Figure 8:
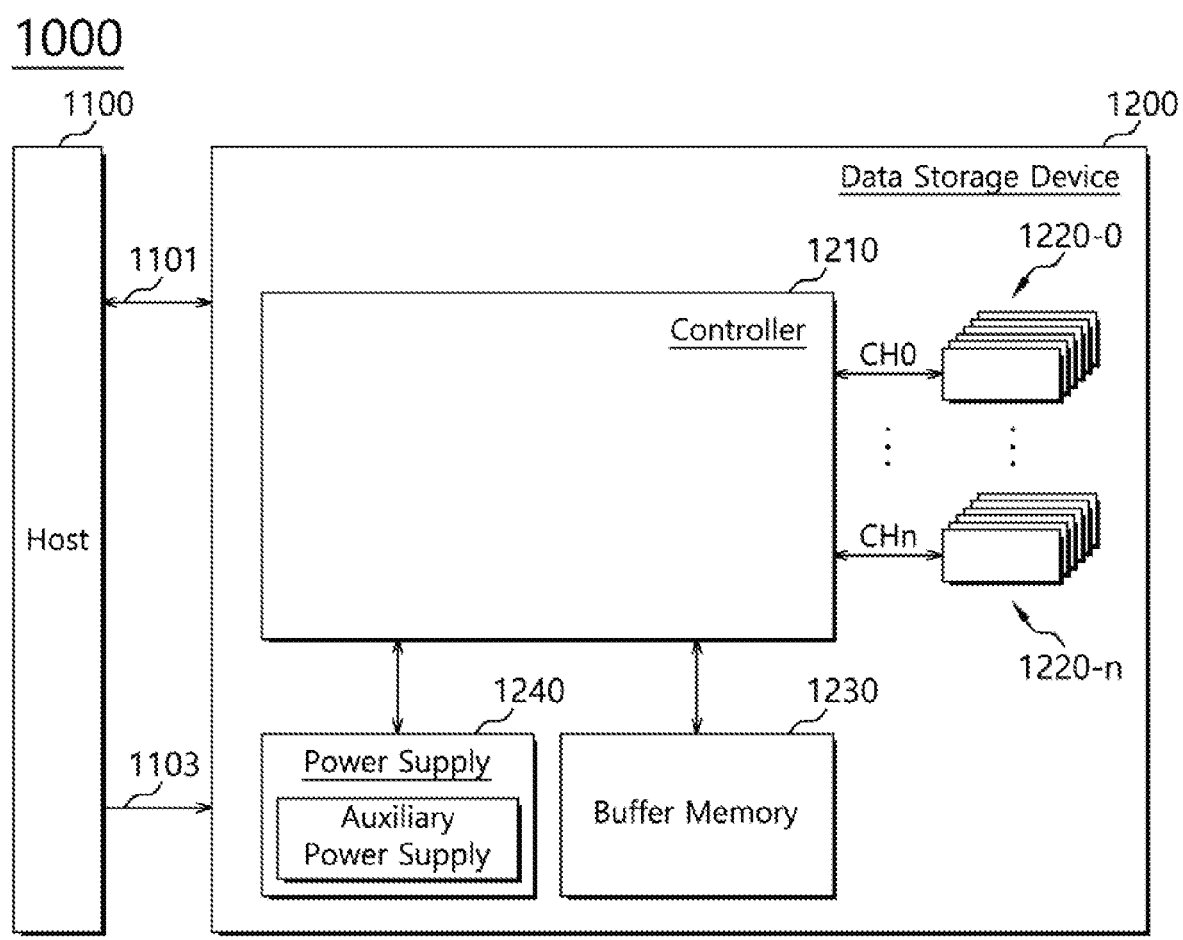
FIG. 8 is a diagram, illustrating a data storage system, in accordance with an embodiment.

FIG. 8 is a diagram, illustrating a data storage system 1000, in accordance with an embodiment.

Referring to FIG. 8, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control the general operations of the data storage device 1200. The controller 1210 may include a host interface unit, a control unit, a random access memory used as a working memory, an error correction code (ECC) unit, and a memory interface unit. In an embodiment, the controller 1210 may be configured as the controller 110 shown in FIGS. 1 to 5.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to a firmware or software in order to drive the data storage device 1200.

The buffer memory device 1230 may temporarily store data that is later to be stored in at least one of the nonvolatile memory devices 1220-0 to 1220-n. Further, the buffer memory device 1230 may temporarily store the data read from at least one of the nonvolatile memory devices 1220-0 to 1220-n. The data, temporarily stored in the buffer memory device 1230, may be transmitted to the host device 1100 or at least one of the nonvolatile memory devices 1220-0 to 1220-n based on the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices, coupled to each channel, may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of the various types of connectors depending on an interface scheme between the host device 1100 and the data storage device 1200.

The power connector 1103 may be configured as one or more of the various types of connectors depending on a power supply scheme of the host device 1100.

Figure 9:
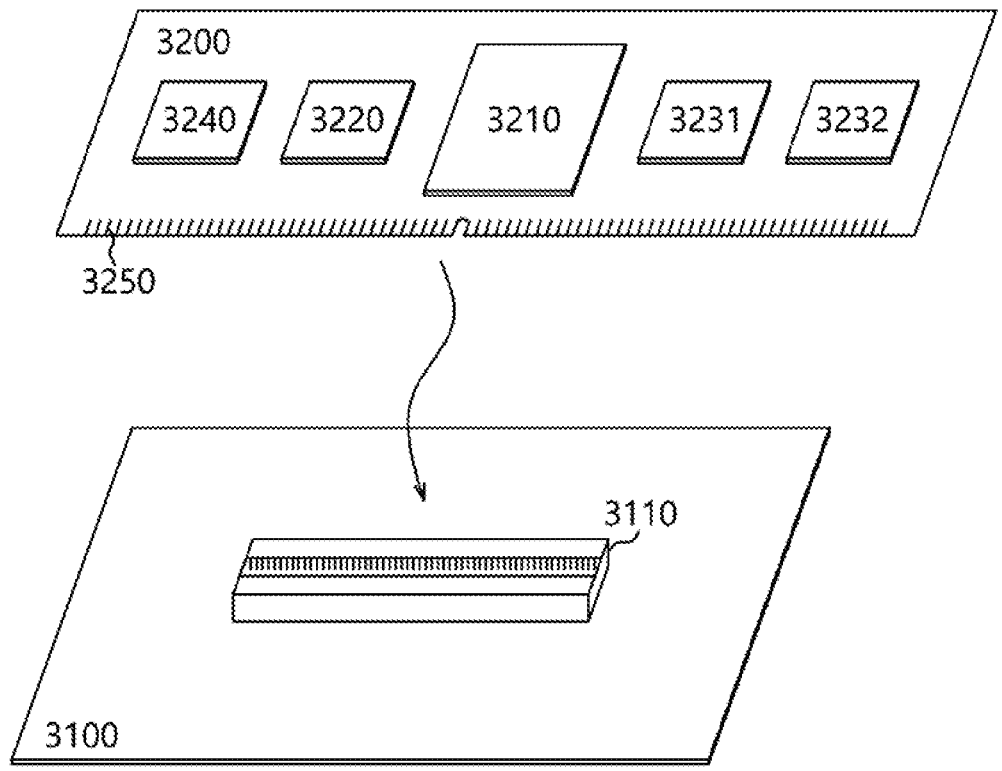
FIG. 9 and FIG. 10 are diagrams, illustrating a data processing system, in accordance with an embodiment.

FIG. 9 is a diagram illustrating a data processing system 3000, in accordance with an embodiment. Referring to FIG. 9, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 to 5.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 based on the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 based on the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 10:
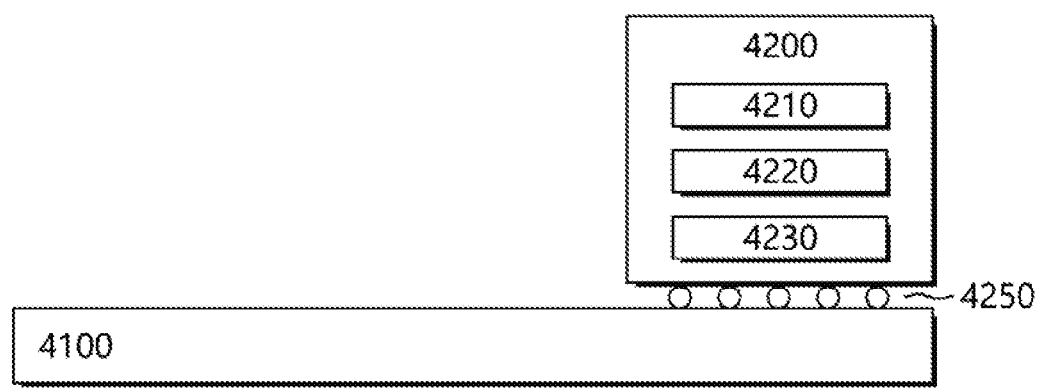

FIG. 10 is a diagram illustrating a data processing system 4000 in accordance with an embodiment. Referring to FIG. 10, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 to 5.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 based on the controller 4210.

The nonvolatile memory device 4230 may be used as the storage medium of the memory system 4200.

Figure 11:
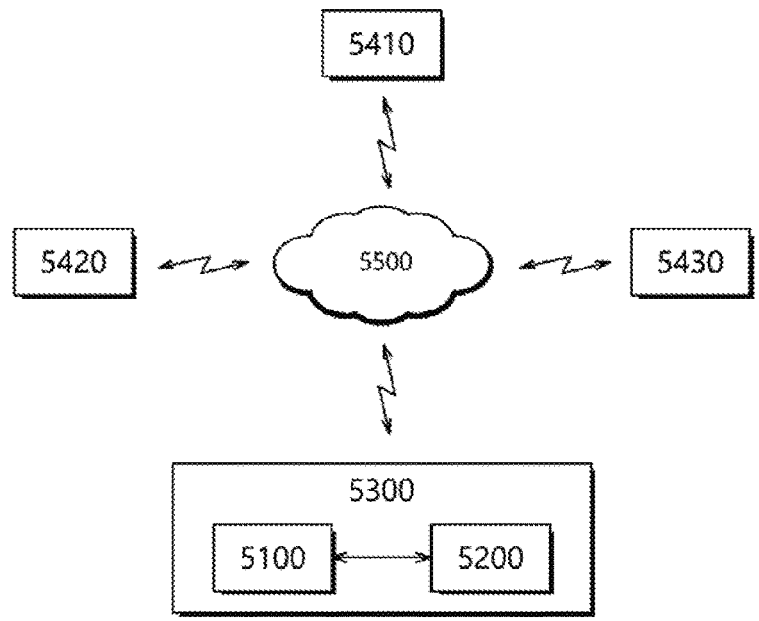
FIG. 11 is a diagram, illustrating a network system including a data storage device, in accordance with an embodiment.

FIG. 11 is a diagram illustrating a network system 5000 including a data storage device, in accordance with an embodiment. Referring to FIG. 11, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 8, the memory system 3200 shown in FIG. 9, or the memory system 4200 shown in FIG. 10.

Figure 12:
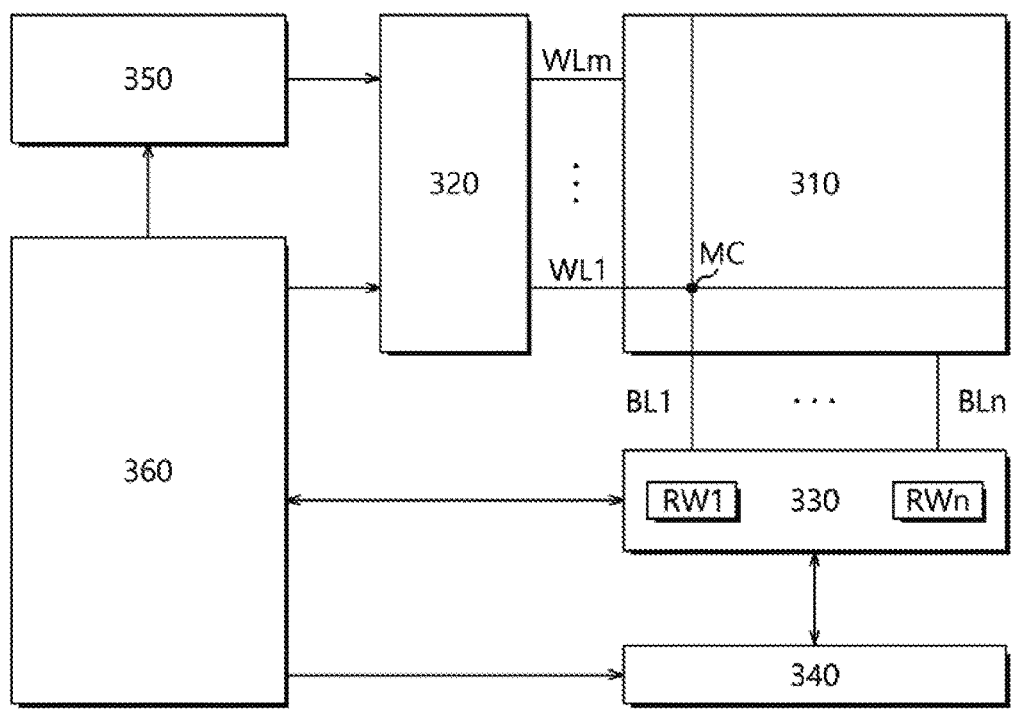
FIG. 12 is a block diagram, illustrating a nonvolatile memory device included in a data storage device, in accordance with an embodiment.

FIG. 12 is a block diagram illustrating a nonvolatile memory device 300 included in a data storage device, such as the data storage device 10, in accordance with an embodiment. Referring to FIG. 12, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure by perpendicular direction to the flat surface of a semiconductor substrate. Moreover, the three-dimensional memory array means a structure including NAND strings which memory cells comprised in NAND strings are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, in the NAND strings of the three-dimensional memory array memory cells are arranged in the horizontal and vertical directions with respect to the surface of the semiconductor substrate. The memory cells may be variously spaced to provide different degrees of integration The row decoder 320 may be coupled with the memory cell array 310 through the word lines WL1 to WLm. The row decoder 320 may operate based on the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate based on the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate based on the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

While various embodiments have been described above, it will be understood to those skilled in the art that the embodiments described are examples only. Accordingly, the data storage device, the computing device and the operation method thereof, which have been described herein, should not be limited based on the described embodiments.

What is claimed is:

1. A data storage device comprising:
 a controller, including a device memory, configured to communicate with a host having a host memory having one or more host unit regions configured to store data in a first size and
 a storage comprising a nonvolatile memory device,
 wherein the controller comprises a map data manager configured to store map data in the storage, the map data including a mapping relationship between logical addresses of the host and physical addresses of the data storage device, configured to group the logical addresses into logical address groups so that the total size of map data for each of the logical address groups corresponds to the first size, and manage a reference count for each of the logical address groups;
 wherein the map data manager comprises:

an index manager configured to group the logical addresses into one or more logical address groups and configured to manage the logical addresses for each of the logical address groups, physical addresses corresponding to the logical addresses, per entry reference counts indicating access counts for the respective logical addresses, and per group reference counts indicating access counts for the respective logical address groups;

a counter configured to calculate the per entry reference counts and the per group reference counts;

a selector configured to select a logical address group, the map data of which is stored in the host unit region based on the per group reference counts; and a write control component configured to store the map data of the logical address group selected by the selector in the host unit region.

2. The data storage device according to claim 1, wherein the map data manager is configured transfer all or part of the map data to the host memory.

3. The data storage device according to claim 1, wherein the controller allocates one or more device unit regions having a second size to the device memory in order to store at least some of the map data, and the first size and the second size are different from each other.

4. The data storage device according to claim 1, wherein the map data comprise the logical addresses, physical addresses corresponding to the logical addresses, and a reference count indicating an access count for each of the logical addresses.

5. The data storage device according to claim 1, wherein the counter calculates the per group reference count by adding up the per entry reference counts included in the logical address group.

6. A computing device comprising:
a data storage device including a controller, having a device memory, and a storage, having a nonvolatile memory device; and
a host configured to communicate with the data storage device,
wherein the data storage device stores map data in the storage, the map data including a mapping relationship between logical addresses of the host and physical addresses of the data storage device,
wherein the host comprises:
a host memory;
a processor configured to allocate one or more host unit regions configured to store data in a first size to the host memory; and
a map data manager configured to group the logical addresses of the host into logical address groups so that the total size of the map data for each of the logical address groups corresponds to the first size and configured to manage a reference count for each of the logical address groups;
wherein the map data manager comprises:
an index manager configured to group the logical address into one or more logical address groups, and configured to manage the logical addresses for each of the logical address groups, physical addresses corresponding to the logical addresses, per entry reference counts indicating access counts for the respective logical addresses, and per group reference counts indicating access counts for the respective logical address groups;
a counter configured to calculate the per entry reference counts and the per group reference counts;

a selector configured to select a logical address group, the map data of which is stored in the host unit region based on the per group reference counts; and a write control component configured to store the map data of the logical address group selected by the selector in the host unit region.

7. The data storage device according to claim 6, wherein the map data manager is configured to transfer all or part of the map data to the host memory.

8. The computing device according to claim 6, wherein the controller allocates one or more device unit regions having a second size to the device memory in order to store at least some of the map data, and the first size and the second size are different from each other.

9. The computing device according to claim 6, wherein the map data comprise the logical addresses, physical addresses corresponding to the logical addresses, and a reference count indicating an access count for each of the logical addresses.

10. The computing device according to claim 6, wherein the counter calculates the per group reference count by adding up the per entry reference counts included in the logical address group.

11. An operation method of a computing device which includes a data storage device including a controller, having a device memory, and a storage, having a nonvolatile memory device, and a host configured to communicate with the data storage device, the operation method comprising the steps of:

storing, by the data storage device, map data in the storage, the map data including a mapping relationship between logical addresses of the host and physical addresses of the data storage device;

allocating, by the host, one or more host unit regions configured to store data in a first size to a host memory;

grouping, by the controller, the logical addresses into logical address groups so that the total size of map data for each of the logical address groups corresponds to the first size; and managing, by the controller, per group reference counts for the respective logical address groups; and wherein the method further comprising:

transferring, by a map data manager, all or part of the map data to the host memory, wherein the controller comprises the map data manager;

wherein the map data comprises the logical addresses, physical addresses corresponding to the logical addresses, and a reference count indicating an access count for each of the logical addresses; and wherein the step of managing the per group reference count comprises the step of managing the logical addresses for each of the logical address groups, physical addresses corresponding to the logical addresses, per entry reference counts indicating access counts for the respective logical addresses, and the per group reference counts indicating access counts for the respective logical address groups.

12. The operation method according to claim 11, further comprising the step of allocating, by the controller, one or more device unit regions, having a second size different from the first size, to the device memory in order to store at least some of the map data.

13. The operation method according to claim 11, further comprising the steps of:
selecting a logical address group, the map data of which is stored in the host unit region based on the per group reference counts; and storing the map data of the selected logical address group in the host unit region.

14. The operation method according to claim 13, wherein the step of selecting the logical address group further comprises the step of calculating the per group reference count by adding up the per entry reference counts included in the logical address group versions and listings of claims in the application.

* * * * *